United States Patent
Busboom et al.

[19]

[11] Patent Number: 5,845,475
[45] Date of Patent: Dec. 8, 1998

[54] LAWN MOWER HAVING FLOW CONTROL BAFFLES AND REMOVABLE MULCHING BAFFLES

[75] Inventors: Garry W. Busboom; John C. Crumrine, both of Beatrice, Nebr.

[73] Assignee: ExMark Mfg. Co., Inc., Beatrice, Nebr.

[21] Appl. No.: 784,825

[22] Filed: Jan. 17, 1997

Related U.S. Application Data

[63] Continuation-in-part of Ser. No. 559,575, Nov. 16, 1995.

[51] Int. Cl.$^6$ .................................................. A01D 67/00
[52] U.S. Cl. ..................... 56/320.1; 56/17.4; 56/DIG. 20
[58] Field of Search ............................... 56/320.1, 320.2, 56/DIG. 9, 17.5, 17.4, DIG. 20, DIG. 24, DIG. 22

[56] References Cited

U.S. PATENT DOCUMENTS

| | | | |
|---|---|---|---|
| 4,055,036 | 10/1977 | Kidd | 56/320.2 X |
| 4,787,195 | 11/1988 | Wenzel | 56/11.1 |
| 4,920,734 | 5/1990 | Wenzel | 56/11.1 |
| 4,941,864 | 7/1990 | Bottum | 474/133 |
| 4,958,484 | 9/1990 | Busboom | 56/255 |
| 4,967,543 | 11/1990 | Scag et al. | 56/10.8 |
| 5,077,959 | 1/1992 | Wenzel | 56/11.1 |
| 5,127,215 | 7/1992 | Wenzel | 56/11.1 |
| 5,129,217 | 7/1992 | Loehr | 56/13.6 |
| 5,133,176 | 7/1992 | Baumann et al. | 56/320.1 X |
| 5,155,985 | 10/1992 | Oshima et al. | 56/10.8 |
| 5,205,112 | 4/1993 | Tillotson et al. | 56/2 |
| 5,210,998 | 5/1993 | Hojo et al. | 56/320.1 X |
| 5,212,938 | 5/1993 | Zenner et al. | 56/320.1 |
| 5,239,810 | 8/1993 | Gugel | 56/10.8 |
| 5,249,411 | 10/1993 | Hake | 56/11.6 |
| 5,251,429 | 10/1993 | Minato et al. | 56/17.2 |
| 5,267,429 | 12/1993 | Kettler et al. | 56/320.2 X |
| 5,305,589 | 4/1994 | Rodriquez et al. | 56/320.1 |
| 5,337,543 | 8/1994 | Kitamura et al. | 56/10.8 |
| 5,355,661 | 10/1994 | Tomiyama | 56/10.8 |
| 5,355,664 | 10/1994 | Zenner | 56/15.8 |
| 5,457,947 | 10/1995 | Samejima et al. | 56/320.2 X |
| 5,465,564 | 11/1995 | Koehn et al. | 56/320.2 |
| 5,518,079 | 5/1996 | Zvolanek | 180/19.1 |
| 5,609,011 | 3/1997 | Kuhn et al. | 56/320.1 X |
| 5,628,171 | 5/1997 | Stewart et al. | 56/320.2 |

OTHER PUBLICATIONS

Walker Mowers Brochure "Fast, Easy, Beautiful Moving™" Dec. 1996.
Toro "Groundmaster 580–D" Brochure.
Toro "Groundmaster 300 Series" Brochure.
Toro "Groundmaster 200 Series" Brochure.
Toro "Proline P.O.S." Brochure.
Toro "Landscape Contractor Equipment" Brochure.

*Primary Examiner*—Thomas B. Will
*Assistant Examiner*—Victor Batson
*Attorney, Agent, or Firm*—Zarley,McKee,Thomte Voorhees & Sease; Dennis L. Thomte

[57] ABSTRACT

A multiblade lawn mower including a mower deck having a plurality of cutting blades rotatably disposed therein. A first flow control baffle is positioned in the mower deck between the cutting blades and the front wall of the mower deck and extends substantially continuously between the sides of the mower deck. A second flow control baffle is positioned in the mower deck rearwardly of the cutting blades. The first and second flow control baffles include a plurality of semi-circular baffle portions which define a plurality of open throat portions therebetween. A plurality of selectively removable mulcher baffles are positioned in the mower deck to close the throat portions, thereby defining a substantially cylindrical mulching chamber around each of the cutting blades.

2 Claims, 4 Drawing Sheets

LAWN MOWER HAVING FLOW CONTROL BAFFLES AND REMOVABLE MULCHING BAFFLES

CROSS-REFERENCE TO RELATED APPLICATION

This is a continuation-in-part application of application Ser. No. 08/559,575 filed Nov. 16, 1995, entitled HILLSIDE-STABLE POWERABLY-MOTIVATED LAWN MOWERS.

BACKGROUND OF THE INVENTION

1. Field of the Invention

This invention relates to a lawn mower having multiple rotary cutting blades and more particularly to a lawn mower of the type described having a first flow control baffle positioned at the underside of the mower deck forwardly of the multiple rotary cutting blades, a second flow control baffle positioned at the underside of the mower deck rearwardly of the multiple rotary cutting blades, and further including mulching baffles removably positioned between the first and second flow control baffles which enables the mower to be easily converted from a side discharge mower to a mulching mower.

2. Description of the Related Art

Commercial-type lawn mowers, whether they are walk-behind or riding mowers, normally include a mower deck having multiple rotary cutting blades positioned therein. The mower deck may be classified either as a mulching deck, a side discharge deck, a rear discharge deck or a bagging deck depending upon the manner in which the cut grass cuttings or clippings are handled or directed. When a mower is of the side discharge deck type, the grass clippings are discharged out one side of the deck and onto the ground. If the lawn mower is of the mulching deck type, the grass clippings are re-cut into finer particles and are then discharged directly down to the ground. Oftentimes, a mower is converted from a side discharge mower to a mulching mower and vice versa by changing certain of the deck baffles and the type of blade.

The prior art has previously provided mulching baffles or housings which are attached to the underside of the mower deck around the path of each cutting blade. The mulching baffles maintain the clippings cut by each blade in an enclosed area around the blade so that the clippings are re-cut by the mulching blades and are directed down to the ground. The mulching blades used on such prior art mowers normally have secondary cutting edges spaced inwardly from the primary cutting edges, which re-cut the clippings and direct them downward to the ground. For example, see U.S. Pat. No. 5,129,217 wherein a multiblade mower is described which has removably affixed mulching housings secured to the underside of the mower deck top wall and which overlie the associated cutting blade. Another type of prior art lawn mower having mulching capabilities has been marketed by Exmark Mfg. Co., Inc., the assignee of this invention, under the trademark Micro-Mulch. In the prior art lawn mowers known to applicants herein, and as described hereinabove, the lawn mowers are only able to be converted to a mulching mower and vice versa through the labor-intensive and time-consuming installation of mulching baffles or housings.

In the lawn mower of the co-pending application identified hereinabove, first and second flow control baffles are provided which are positioned forwardly and rearwardly, respectively, of the rotary cutting blades and which serve to efficiently direct the cut grass clippings towards the side discharge of the mower deck. The removable mulching baffles described in this invention are designed to cooperate with the flow control baffles described in the co-pending application.

It is therefore a principal object of the invention to provide an improved multiblade lawn mower.

A further object of the invention is to provide a multiblade, side discharge mower having flow control baffles and removable mulching baffles.

Still another object of the invention is to provide a lawn mower of the type described wherein removable mulching baffles may be quickly and easily attached to the underside of the mower deck.

Still another object of the invention is to provide a lawn mower of the type described including removable mulching baffles which cooperate with flow control baffles to define individual mulching chambers surrounding each of the rotary cutting blades.

Still another object of the invention is to provide a lawn mower of the type described having a flow control baffle which efficiently directs the grass clippings and air towards the side discharge of the mower deck in a manner which prevents the grass clippings and air from being directed downwardly onto the ground or turf unless the mulching baffles are mounted on the mower.

Still another object of the invention is to provide removable mulching baffles for a multiblade lawn mower which is comprised of a minimum number of parts and which requires a minimum number of connection points.

These and other objects will be apparent to those skilled in the art.

SUMMARY OF THE INVENTION

A multiblade lawn mower is described comprising a mower deck including a top wall, a front wall, a back wall and first and second side walls which define a downwardly directed opening. One of the side walls has a discharge opening formed therein so that the mower deck discharges grass clippings from one side thereof. The grass clippings may either be discharged from the discharge opening onto the ground or into some sort of collection container, bag or hopper. A plurality of cutting blades are rotatably disposed within the mower deck and are driven by a suitable power means. A first flow control baffle is positioned in the mower deck which extends downwardly from the interior surface of the top wall of the mower deck between the cutting blades and the front wall of the mower deck. The first flow control baffle extends substantially continuously from a first location adjacent the interior surface of the side wall opposite the discharge opening to a second location adjacent the interior surface of the side wall having the discharge opening formed therein. A second flow control baffle is also positioned in the mower deck which extends downwardly from the interior surface of the top wall of the mower deck between the cutting blades and the back wall of the mower deck. The second flow control baffle includes a plurality of semi-circular baffle portions, each of which are positioned adjacent one of the cutting blades. The first and second flow control baffles define a plurality of open throat portions which are positioned between the adjacent cutting blades.

When the mower is used strictly as a side discharge mower, the flow control baffles, and especially the first flow control baffle, efficiently direct the grass clippings and air to the side discharge opening without the grass clippings being deflected downwardly from the walls of the mower deck onto the ground. When it is desired to convert the mower to a mulching mower, a plurality of removable mulcher baffles are secured to the first flow control baffle, the second flow control baffle and the mower deck to close the throat portions, and the discharge opening, whereby the first and second flow control baffles cooperate, with the mulching baffles, to define a substantially cylindrical mulching chamber around each of the cutting blades.

DESCRIPTION OF THE PREFERRED EMBODIMENT

Figure 1:
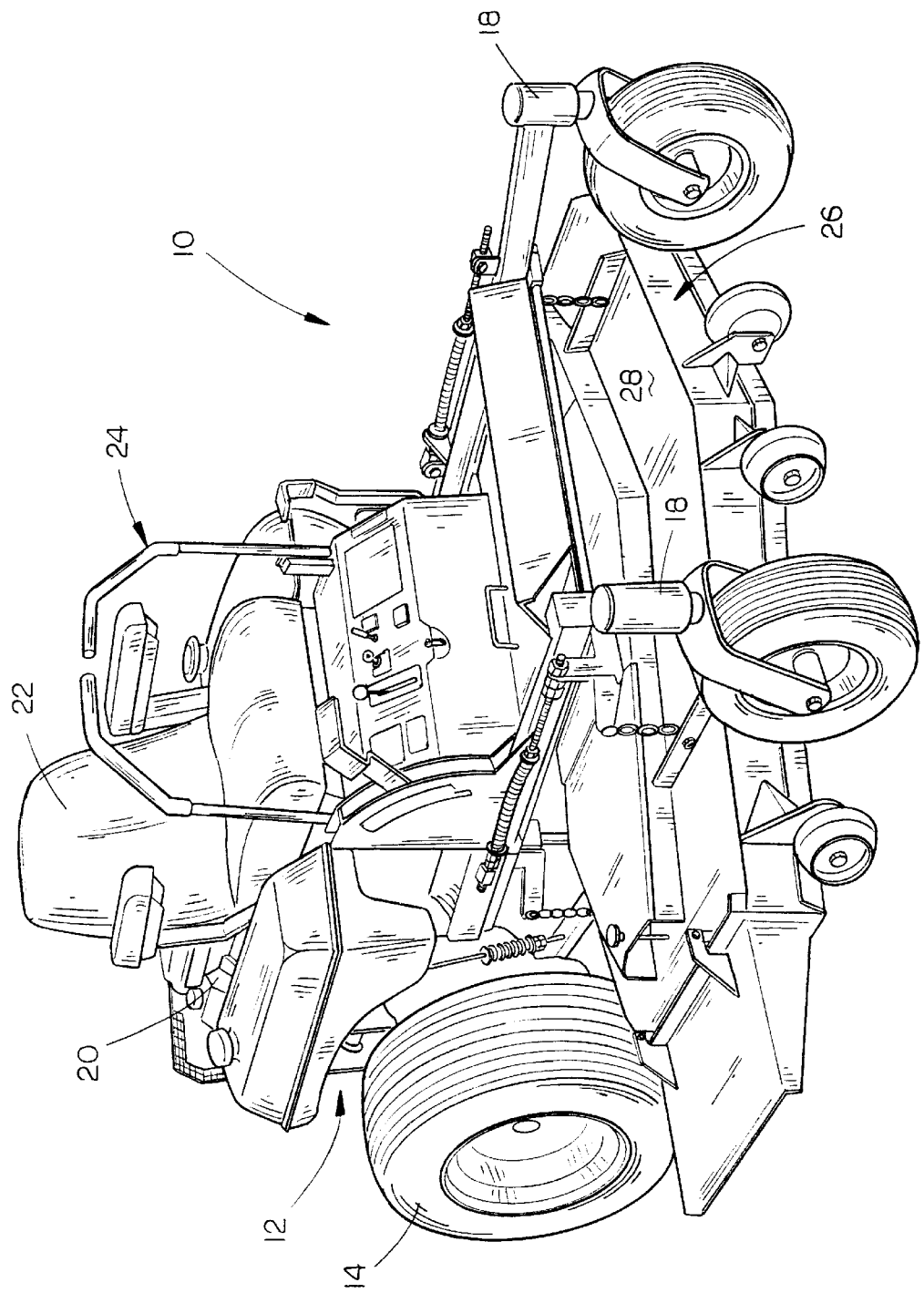
FIG. 1 is a front perspective view of a lawn mower having the flow control baffles and removable mulching baffles installed thereon.
Figure 2:
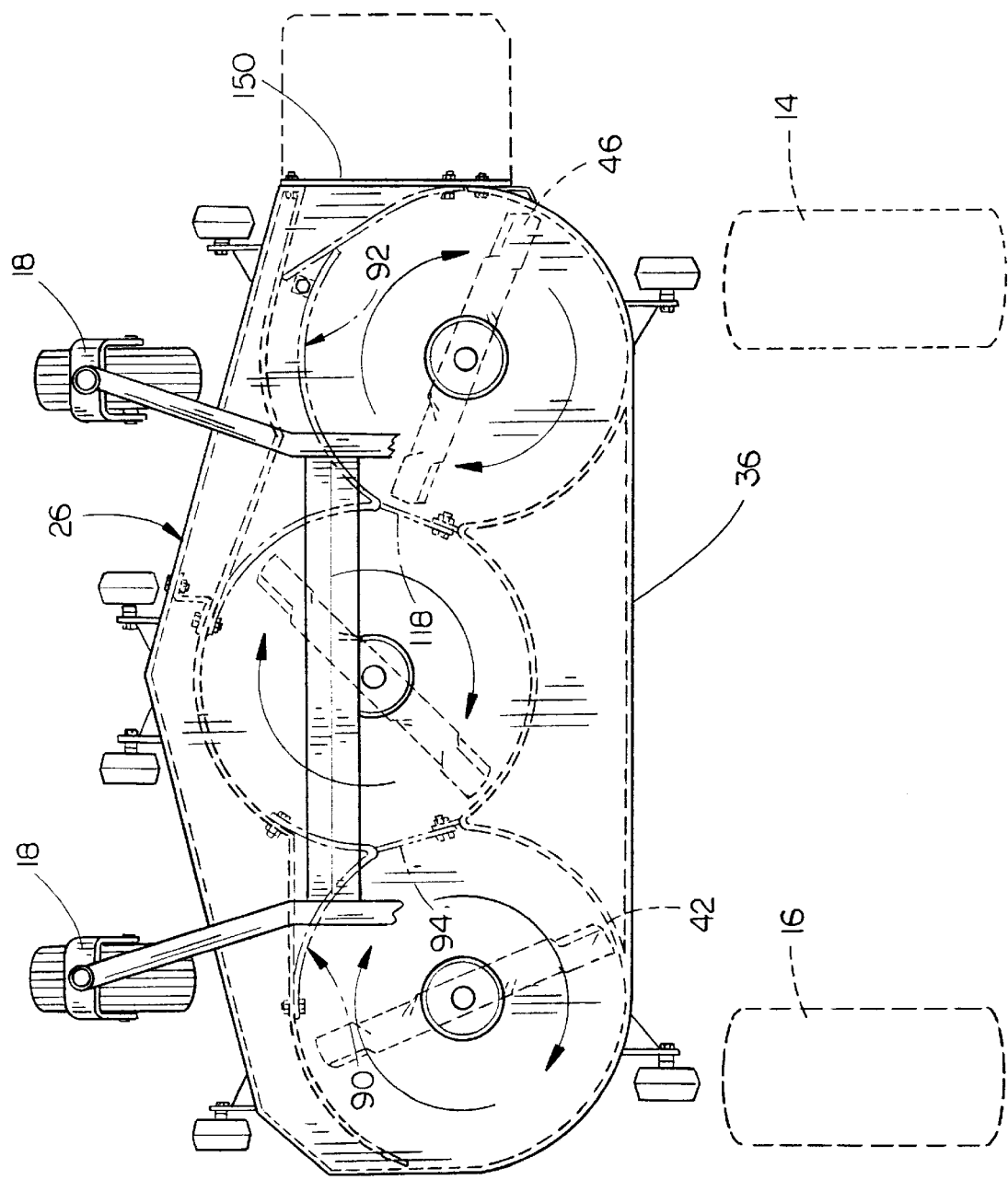
FIG. 2 is a partial top elevational view of the lawn mower.

The numeral 10 refers to a multiblade lawn mower upon which the invention herein is mounted. Lawn mower 10 is shown to be a riding lawn mower, but it could also be a walk-behind or pull-type lawn mower. Lawn mower 10 generally includes a frame 12 having a pair of driven wheels 14 and 16 at the rear end thereof and at least one or more caster wheels 18 at the forward end thereof. Lawn mower 10 also includes a conventional power means, such as an internal combustion engine 20, for driving the wheels 14 and 16 and for driving the cutting blades, as will be described hereinafter. An operator's station 22 is provided on frame 12 to accommodate an operator. The conventional controls 24 are also provided.

Mower deck 26 is mounted on the forward end of frame 12 and, in the embodiment shown in the drawings, "floats" with respect to frame 12 in a generally conventional fashion. Mower deck 26 includes a top wall 28, a front wall 30 extending downwardly from the forward end of top wall 28, a left side wall 32 extending downwardly from the left side of the top wall 28, a right side wall 34 extending downwardly from the right side of top wall 28, and back wall 36 extending downwardly from the rearward end of top wall 28. In the embodiment shown in the drawings, right side wall 34 is provided with a discharge opening, generally referred to by the reference numeral 38, which may take any conventional shape. It should also be noted that discharge opening 38 could be provided in left side wall 32 if required or desired. Thus, mower deck 26 is a side discharge mower deck which will normally discharge the grass cuttings or clippings therefrom, for deposit on the ground, at the right side of the lawn mower or into some sort of collection container, bag, etc.

Figure 3:
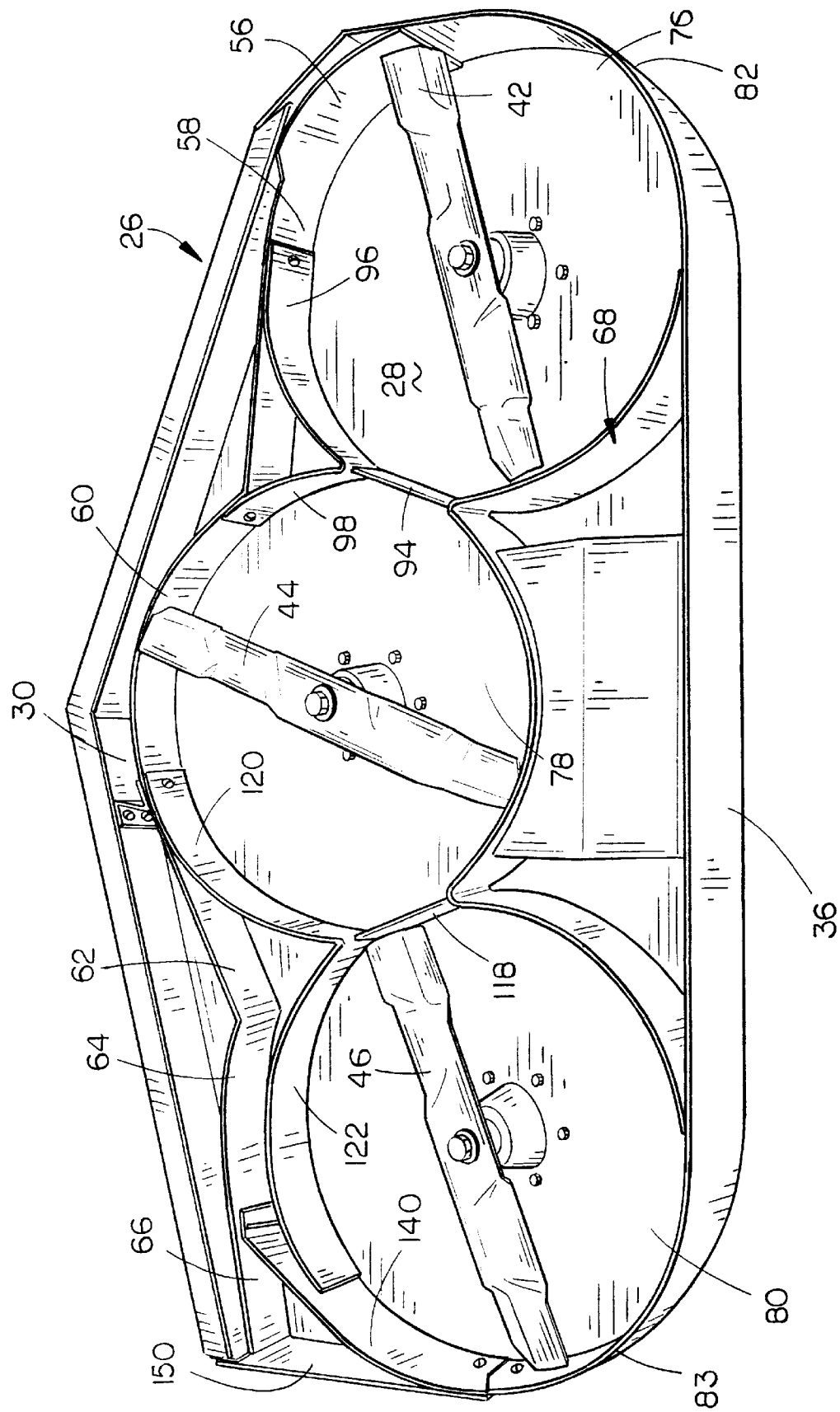
FIG. 3 is a bottom perspective view of the mower deck having the removable mulching baffles installed thereon.
Figure 4:
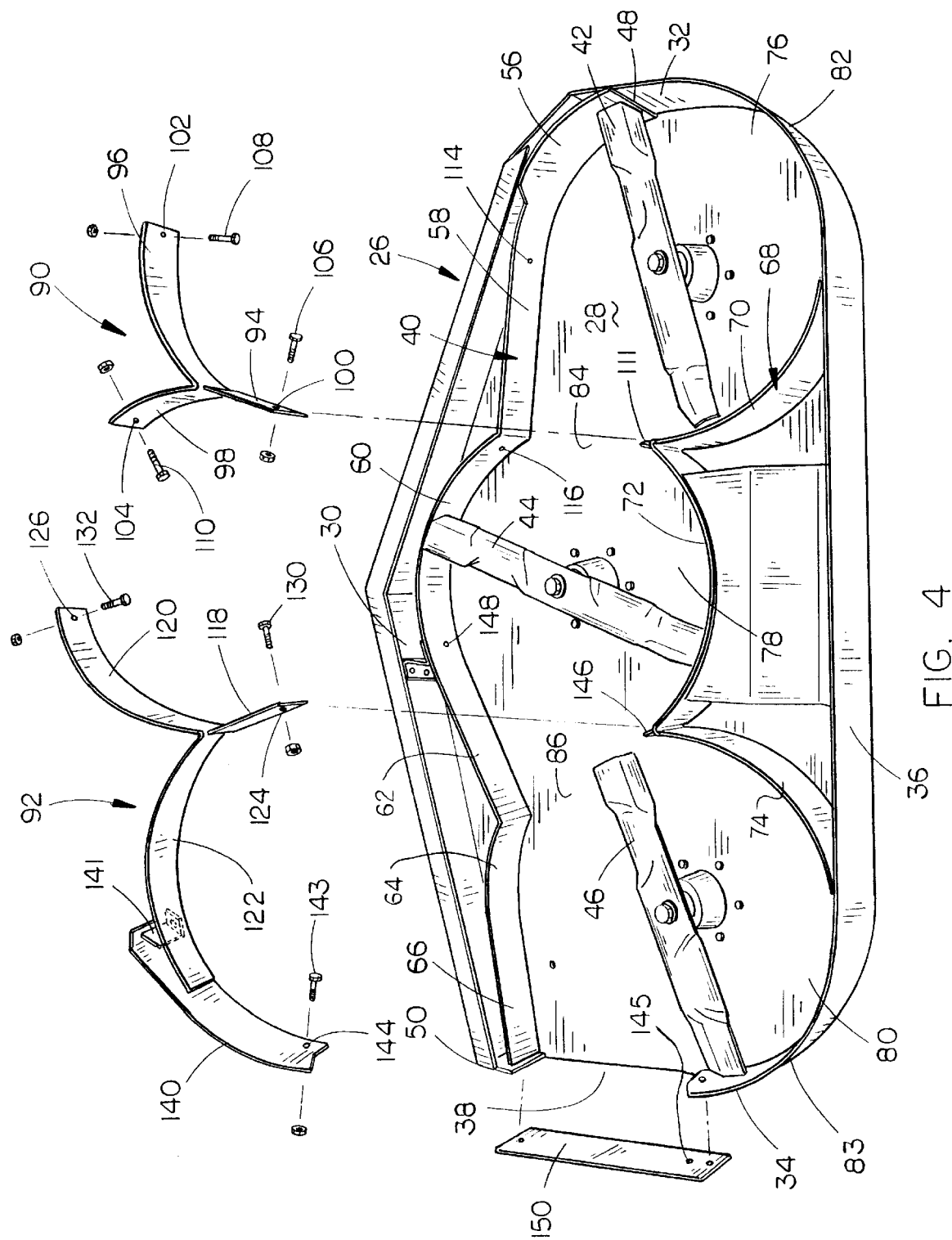
FIG. 4 is an exploded bottom perspective view of the mower deck of FIG. 3.

FIGS. 3 and 4 are bottom views of the mower deck and it can be seen therefrom that a first flow control baffle 40, constructed of a suitable metal material, is positioned between the interior surface of front wall 30 and the rotary cutting blades 42, 44 and 46 which are rotatably supported by conventional spindles or the like on top wall 28 and which are suitably driven, through a belt mechanism, or other suitable drive mechanism, by the engine of the lawn mower.

Flow control baffle 40 has one end positioned or located adjacent the interior surface of left side wall 32 at 48 and has its other end positioned or located adjacent the interior surface of right side wall 34 at 50 which is adjacent the forward end of discharge opening 38. Preferably, baffle 40 is secured to the underside of top wall 28 by welding. However, baffle 40 could be secured to top wall 28 by bolts or the like. For purposes of description, assuming that three cutting blades are utilized, baffle 40 includes a first arcuate baffle portion 56 which partially extends around the blade tip path of cutting blade 42, a first relatively straight baffle portion 58, a second arcuate baffle portion 60 which partially extends around the blade tip path of cutting blade 44, a second relatively straight baffle portion 62, a third arcuate baffle portion 64 which partially extends around the blade tip path of cutting blade 46, and a third relatively straight baffle portion 66.

As seen in FIGS. 3 and 4, a second flow control baffle 68 is also provided in mower deck 26 and is positioned rearwardly of cutting blades 42, 44 and 46 and extends downwardly from the underside of top wall 28. Baffle 68 may be either welded to or bolted to the top wall 28 as desired. Baffle 68 is comprised of semi-circular baffle portions 70, 72 and 74, as seen in FIG. 4. As seen in FIG. 4, the rear corners of deck 26 are rounded and form continuations of the baffle portions 70 and 74. The rear corners of the deck are referred to by the reference numerals 82 and 83, respectively. If the rear corners of the corners of the deck 26 are substantially square, i.e., not rounded, it is preferred that the outer ends of baffle portions 70 and 74 be extended, in a semi-circular fashion, to the interior surfaces of walls 32 and 34, respectively. For purposes of description, the flow control baffles 40 and 68 define cutting chambers 76, 78 and 80, respectively. It should also be understood that, in some cases, back wall 36 may be eliminated with the flow control baffle 68 forming the back wall of the mower deck.

As cutting blades 42, 44 and 46 are rotated by the engine on the lawn mower, the grass cuttings created by cutting blade 42 are deflected upwardly and outwardly and strike either the interior surface of baffle portion 70, the interior surface of corner 82, the interior surface of baffle portion 56 and/or the interior surface of baffle portion 58 with those surfaces further deflecting the cuttings upwardly into the area above the outer ends of cutting blade 42 for discharge through throat portion 84, located between cutting chambers 76 and 78. Baffle portion 58 deflects the cuttings inwardly into the path of cutting blade 44, but thereabove for the most part.

Cutting blade 44 performs similarly in cutting chamber 78 with the baffle portions 72, 60 and 62 causing the cuttings to be deflected upwardly, as in chamber portion 76, and to be discharged through the throat portion 86, located between cutting chambers 78 and 80. Baffle portion 62 deflects the cuttings inwardly into the path of cutting blade 46, but thereabove for the most part.

Cutting blade 46 performs similarly in cutting chamber 80 with the baffle portions 74, 64, 66 and the interior surface of corner 83 causing the cuttings to be deflected upwardly and along the interior surface of baffle portion 66 and to be discharged through discharge opening 38. As seen, throat portion 86 is larger than throat portion 84 due in part to the larger volume of cuttings necessarily being passed through throat portion 86.

FIGS. 3 and 4 illustrate the removable mulching baffles of this invention which are referenced by the numerals 90 and 92, respectively. Baffle 90 is generally Y-shaped and includes a base portion 94 and arcuate legs 96 and 98. Base portion 94 is provided with an opening 100 formed therein adjacent the end thereof. Legs 96 and 98 are provided with openings 102 and 104 formed therein, respectively. Openings 100, 102 and 104 are adapted to receive bolts 106, 108 and 110, respectively. Bracket 111 is secured to baffle portion 72 and has an opening formed therein adapted to receive bolt 106 to fix base portion 94 to baffle portion 72. Flow control baffle 40 has an opening 114 adjacent the juncture of baffle portions 56 and 58 which is adapted to receive bolt 108 to fix leg 96 to flow baffle 40 to close throat portion 84 to create a mulching chamber surrounding cutting blade 42. One end of baffle portion 60 has an opening 116 formed therein which receives the bolt 110 to fix leg 98 to flow control baffle 40.

Baffle 92 is also generally Y-shaped and includes a base portion 118 and legs 120 and 122. Baffle 92 has openings 124 and 126 formed therein adjacent the ends of base portion 118 and leg 120, respectively, which are adapted to receive bolts 130 and 132, respectively. The numeral 140 refers to a "blocking" member which is preferably provided at the end of leg 122, as seen in FIG. 4. Member 140 has a bracket 141 affixed thereto which is adapted to be bolted to top wall 28.

Mulching baffle 92 is mounted to the underside of the mower deck as follows. Baffle 92 is positioned as illustrated in FIG. 3. Bolt 130 is inserted through opening 124 in leg 118 and an opening formed in bracket 146 which is secured to the end of baffle portion 74. Bolt 132 is inserted through opening 126 in leg 120 and through an opening 148 provided in flow control baffle 40 adjacent the juncture of baffle portions 60 and 62. Bolt 143 is extended through opening 144 in member 140 and through the opening 145. When so installed, baffle 92 closes throat portion 86 and discharge opening 38 to create a mulching chamber surrounding cutting blade 46. It is also preferred that discharge opening 38 be completely closed by means of plate 150 which is bolted to mower deck 26 by suitable bolts. One end of member 140 is bolted to plate 150 by bolt 143 extending through opening 144 formed in member 140 and through opening 145 formed in plate 150. The closing of the throat portions 84 and 86 also creates a mulching chamber surrounding cutting blade 44. The forward end of member 140, by being positioned adjacent baffle 40, blocks grass cuttings, which may be between legs 120, 122 and baffle 40, from passing towards the interior surface of side wall 34, where the cuttings would normally be deposited on the turf in an undesirable fashion. The forward end of member 140 directs those cuttings into the cutting path of cutting blade 46 rather than to the area to the side of the path of the cutting blade 46. The mulching baffles 90 and 92 are quickly and easily installed on the mower deck to convert the side discharge mower deck into a mulching deck with a minimum amount of material being required. The baffles 90 and 92 are also quickly and easily removable from the mower deck to return the mower to its side discharge mode when desired.

Thus it can be seen that the invention accomplishes at least all of its stated objectives.

We claim:

1. A multiblade lawn mower, comprising:

a mower deck comprising a top wall, a front wall, a back wall, and first and second side walls defining a downwardly directed opening;

each of said front wall, said back wall, and said opposite side walls having interior and exterior surfaces;

said first side wall having a discharge opening formed therein;

said discharge opening having rearward and forward ends;

means operatively connected to said mower deck for moving said mower deck along the ground;

a plurality of cutting blades rotatably disposed within said mower deck;

power means operatively connected to said cutting blades for causing the rotation of each of said cutting blades;

a first flow control baffle positioned in said mower deck which extends downwardly from the interior surface of said top wall between said cutting blades and said front wall;

said first flow control baffle extending substantially continuously from a first location adjacent the interior surface of said second side wall to a second location adjacent the interior surface of said first side wall and adjacent the forward end of said discharge opening;

a second flow control baffle positioned in said mower deck which extends downwardly from the interior surface of said top wall between said cutting blades and said back wall;

said second flow control baffle including a plurality of semi-circular baffle portions, each of said baffle portions being positioned adjacent one of said cutting blades;

said first and second flow control baffles defining a plurality of open throat portions which are positioned between adjacent cutting blades;

each of said first and second flow control baffles having spaced-apart arcuate portions which cooperate to define a semi-enclosed cutting chamber extending partially around the blade tip path of each of said cutting blades;

a plurality of selectively removable mulcher baffles which close said throat portions to define a substantially cylindrical mulching chamber around each of said cutting blades;

each of said mulcher baffles being generally Y-shaped.

2. A multiblade lawn mower, comprising:

a mower deck comprising a top wall, a front wall, a back wall, and first and second side walls defining a downwardly directed opening;

each of said front wall, said back wall, and said opposite side walls having interior and exterior surfaces;

said first side wall having a discharge opening formed therein;

said discharge opening having rearward and forward ends;

means operatively connected to said mower deck for moving said mower deck along the ground;

a plurality of cutting blades rotatably disposed within said mower deck;

power means operatively connected to said cutting blades for causing the rotation of each of said cutting blades;

a first flow control baffle positioned in said mower deck which extends downwardly from the interior surface of said top wall between said cutting blades and said front wall;

said first flow control baffle extending substantially continuously from a first location adjacent the interior surface of said second side wall to a second location adjacent the interior surface of said first side wall and adjacent the forward end of said discharge opening;

a second flow control baffle positioned in said mower deck which extends downwardly from the interior surface of said top wall between said cutting blades and said back wall;

said second flow control baffle including a plurality of semi-circular baffle portions, each of said baffle portions being positioned adjacent one of said cutting blades;

said first and second flow control baffles defining a plurality of open throat portions which are positioned between adjacent cutting blades;

each of said first and second flow control baffles having spaced-apart arcuate portions which cooperate to define a semi-enclosed cutting chamber extending partially around the blade tip path of each of said cutting blades;

a plurality of selectively removable mulcher baffles which close said throat portions to define a substantially cylindrical mulching chamber around each of said cutting blades;

three of said cutting blades being disposed within said mower deck;

said mulcher baffles including a pair of generally Y-shaped members.

* * * * *

(12) EX PARTE REEXAMINATION CERTIFICATE (5365th)

United States Patent
Busboom et al.

(10) Number: US 5,845,475 C1
(45) Certificate Issued: May 9, 2006

(54) LAWN MOWER HAVING FLOW CONTROL BAFFLES AND REMOVABLE MULCHING BAFFLES

(75) Inventors: Garry W. Busboom, Beatrice, NE (US); John C. Crumrine, Beatrice, NE (US)

(73) Assignee: ExMark Mfg. Co., Inc., Beatrice, NE (US)

Reexamination Request:
No. 90/006,717, Jul. 17, 2003

Reexamination Certificate for:
Patent No.: 5,845,475
Issued: Dec. 8, 1998
Appl. No.: 08/784,825
Filed: Jan. 17, 1997

Related U.S. Application Data

(63) Continuation-in-part of application No. 08/559,575, filed on Nov. 16, 1995, now abandoned.

(51) Int. Cl.
*A01D 67/00* (2006.01)

(52) U.S. Cl. .................. 56/320.1; 56/17.4; 56/DIG. 20
(58) Field of Classification Search ....................... None
See application file for complete search history.

(56) References Cited

U.S. PATENT DOCUMENTS 4,055,036 A 10/1977 Kidd 5,129,217 A 7/1992 Loehr

OTHER PUBLICATIONS

Exmark 48" Mulching Deck Retrofit Kit Instructions #850177 (published before Nov. 16, 1995).

Exmark 52" & 60" Side Discharge Deck Mulching Kit Installation Instructions #850186 (published before Nov. 16, 1995).

Exmark 52" & 60" Side Discharge Deck Mulching Kit Installation Instructions #850338 (published before Nov. 16, 1995).

*Primary Examiner*—Meredith Petravick

(57) ABSTRACT

A multiblade lawn mower including a mower deck having a plurality of cutting blades rotatably disposed therein. A first flow control baffle is positioned in the mower deck between the cutting blades and the front wall of the mower deck and extends substantially continuously between the sides of the mower deck. A second flow control baffle is positioned in the mower deck rearwardly of the cutting blades. The first and second flow control baffles include a plurality of semi-circular baffle portions which define a plurality of open throat portions therebetween. A plurality of selectively removable mulcher baffles are positioned in the mower deck to close the throat portions, thereby defining a substantially cylindrical mulching chamber around each of the cutting blades.

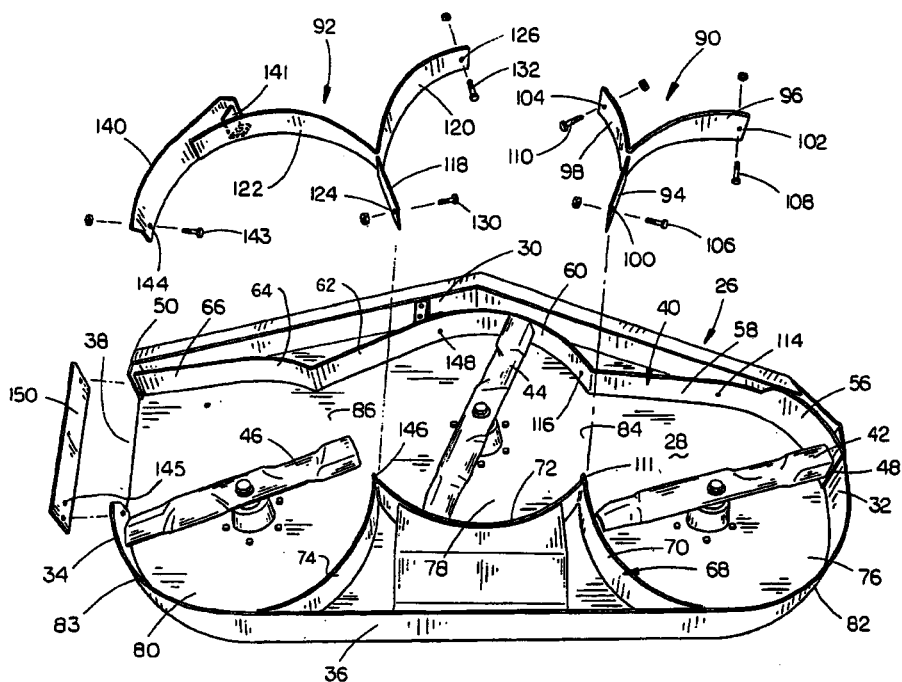

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

New claims 3 and 4 are added and determined to be patentable.

1. A multiblade lawn mower, comprising:
a mower deck comprising a top wall, a front wall, a back wall, and first and second side walls defining a downwardly directed opening;
each of said front wall, said back wall, and said opposite side walls having interior and exterior surfaces;
said first side wall having a discharge opening formed therein;
said discharge opening having rearward and forward ends;
means operatively connected to said mower deck for moving said mower deck along the ground;
a plurality of cutting blades rotatably disposed within said mower deck;
power means operatively connected to said cutting blades for causing the rotation of each of said cutting blades;
a first flow control baffle positioned [in] *wholly within* said mower deck which extends downwardly from the interior surface of said top wall between said cutting blades and said front wall;
said first flow control baffle extending substantially continuously from a first location adjacent the interior surface of said second side wall to a second location adjacent the interior surface of said first side wall and adjacent the forward end of said discharge opening;
a second flow control baffle positioned in said mower deck which extends downwardly from the interior surface of said top wall between said cutting blades and said back wall;
said second flow control baffle including a plurality of semi-circular baffle portions, each of said baffle portions being positioned adjacent one of said cutting blades;
said first and second flow control baffles defining a plurality of open throat portions which are positioned between adjacent cutting blades;
each of said first and second flow control baffles having spaced-apart arcuate portions which cooperate to define a semi-enclosed cutting chamber extending partially around the blade tip path of each of said cutting blades;
a plurality of selectively removable mulcher baffles which close said throat portions to define a substantially cylindrical mulching chamber around each of said cutting blades;
each of said mulcher baffles being generally Y-shaped.

2. A multiblade lawn mower, comprising:
a mower deck comprising a top wall, a front wall, a back wall, and first and second side walls defining a downwardly directed opening;
each of said front wall, said back wall, and said opposite side walls having interior and exterior surfaces;
said first side wall having a discharge opening formed therein;
said discharge opening having rearward and forward ends;
means operatively connected to said mower deck for moving said mower deck along the ground;
a plurality of cutting blades rotatably disposed within said mower deck;
power means operatively connected to said cutting blades for causing the rotation of each of said cutting blades;
a first flow control baffle positioned [in] *wholly within* said mower deck which extends downwardly from the interior surface of said top wall between said cutting blades and said front wall;
said first flow control baffle extending substantially continuously from a first location adjacent the interior surface of said second side wall to a second location adjacent the interior surface of said first side wall and adjacent the forward end of said discharge opening;
a second flow control baffle positioned in said mower deck which extends downwardly from the interior surface of said top wall between said cutting blades and said back wall;
said second flow control baffle including a plurality of semi-circular baffle portions, each of said baffle portions being positioned adjacent one of said cutting blades;
said first and second flow control baffles defining a plurality of open throat portions which are positioned between adjacent cutting blades;
each of said first and second flow control baffles having spaced-apart arcuate portions which cooperate to define a semi-enclosed cutting chamber extending partially around the blade tip path of each of said cutting blades;
a plurality of selectively removable mulcher baffles which close said throat portions to define a substantially cylindrical mulching chamber around each of said cutting blades;
three of said cutting blades being disposed within said mower deck;
said mulcher baffles including a pair of generally Y-shaped members.

3. *A multiblade lawn mower, comprising:*
*a mower deck comprising a top wall, a front wall, a back wall, and first and second side walls defining a downwardly directed opening;*
*each of said front wall, and said back wall, and said opposite side walls having interior and exterior surfaces;*
*said first side wall having a discharge opening formed therein;*
*said discharge opening having rearward and forward ends;*
*means operatively connected to said mower deck for moving said mower deck along the ground;*
*a plurality of cutting blades rotatably disposed within said mower deck;* power means operatively connected to said cutting blades for causing the rotation of each of said cutting blades;

a first flow control baffle positioned in said mower deck which extends downwardly from the interior surface of said top wall between said cutting blades and said front wall;

said first flow control baffle extending substantially continuously from a first location adjacent the interior surface of said second side wall to a second location adjacent the interior surface of said first sidewall and adjacent the forward end of said discharge opening;

a second flow control baffle positioned in said mower deck which extends downwardly from the interior surface of said top wall between said cutting blades and said back wall;

said second flow control baffle including a plurality of semi-circular baffle portions, each of said baffle portions being positioned adjacent one of said cutting blades;

said first and second flow control baffles defining a plurality of open throat portions which are positioned between adjacent cutting blades;

each of said first and second flow control baffles having spaced-apart arcuate portions which cooperate to define a semi-enclosed cutting chamber extending partially around the blade tip path of each of said cutting blade;

a plurality of selectively removable mulcher baffles which close said throat portions to define a substantially cylindrical mulching chamber around each of said cutting blades;

each of said mulcher baffles being generally Y-shaped having at least a first arcuate arm, wherein the first arcuate arm on each mulching baffle extends only partially across an adjacent mulching chamber to cooperate with the first flow control baffle without substantially overlying the arcuate section of the first flow control baffle, whereby the first arcuate arms on the mulching baffles and at least some of the arcuate sections on the first flow control baffle jointly form generally adjacent portions of a peripheral grass clipping confining surface in a plurality of the substantially cylindrical mulching chambers when the mulching baffles are in place closing said throat portions.

4. A multiblade lawn mower, comprising:

a mower deck comprising a top wall, a front wall, a back wall, and first and second side walls defining a downwardly directed opening;

each of said front wall, and said back wall, and said opposite side walls having interior and exterior surfaces;

said first side wall having a discharge opening formed therein;

said discharge opening having rearward and forward ends;

means operatively connected to said mower deck for moving said mower deck along the ground;

a plurality of cutting blades rotatably disposed within said mower deck;

power means operatively connected to said cutting blades for causing the rotation of each of said cutting blades;

power means operatively connected to said cutting blades for causing the rotation of each of said cutting blades;

a first flow control baffle positioned in said mower deck which extends downwardly from the interior surface of said top wall between said cutting blades and said front wall;

said first flow control baffle extending substantially continuously from a first location adjacent the interior surface of said second side wall to a second location adjacent the interior surface of said first sidewall and adjacent the forward end of said discharge opening;

a second flow control baffle positioned in said mower deck which extends downwardly from the interior surface of said top wall between said cutting blades and said back wall;

said second flow control baffle including a plurality of semi-circular baffle portions, each of said baffle portions being positioned adjacent one of said cutting blades;

said first and second flow control baffles defining a plurality of open throat portions which are positioned between adjacent cutting blades;

each of said first and second flow control baffles having spaced-apart arcuate portions which cooperate to define a semi-enclosed cutting chamber extending partially around the blade tip path of each of said cutting blade;

three of said cutting blades being disposed within said mower deck;

each of said mulcher baffles being generally Y-shaped having at least a first arcuate arm, wherein the first arcuate arm on each mulching baffle extends only partially across an adjacent mulching chamber to cooperate with the first flow control baffle without substantially overlying the arcuate section of the first flow control baffle, whereby the first arcuate arms on the mulching baffles and at least some of the arcuate sections on the first flow control baffle jointly form generally adjacent portions of a peripheral grass clipping confining surface in a plurality of the substantially cylindrical mulching chambers when the mulching baffles are in place closing said throat portions.

* * * * *